April 23, 1963  S. L. RIDGWAY  3,086,353
AFTERBURNER SYSTEMS
Filed March 3, 1960  4 Sheets-Sheet 1

STUART L. RIDGWAY
INVENTOR.

BY
ATTORNEY

STUART L. RIDGWAY
INVENTOR.

STUART L. RIDGWAY
INVENTOR.

April 23, 1963 S. L. RIDGWAY 3,086,353
AFTERBURNER SYSTEMS
Filed March 3, 1960 4 Sheets-Sheet 4

STUART L. RIDGWAY
INVENTOR.

BY George C. Thompson, agent
ATTORNEY 3,086,353
AFTERBURNER SYSTEMS
Stuart L. Ridgway, Redondo Beach, Calif., assignor to Thompson Ramo Wooldridge Inc., Canoga Park, Calif., a corporation of Ohio
Filed Mar. 3, 1960, Ser. No. 12,607
18 Claims. (Cl. 60—30)

This invention is concerned with a method and apparatus for controlling air flow and more particularly with a method and apparatus for controlling the mixture of fresh air with the exhaust gas of an internal combustion engine whereby combustibles within the exhaust gas may be oxidized in a manner which will regulate the combustion temperature.

As is known, exhaust gas of an internal combustion engine contains hydrocarbons which are smog-producing, combustible compounds. Although the problem, of eliminating from the exhaust gas these undesirable smog-producing combustible compounds, has received considerable attention in the prior art, no satisfactory system for eliminating them has yet been made commercially available. As a result, the smog problem is increasing to such an extent that the public is now, more than ever before, demanding a feasible solution.

Prior art publications dealing with the cleaning of internal combustion engine exhaust gas suggest mixing the exhaust gas with fresh (oxygen-containing) air and causing the oxidation or reaction of the mixture to take place in some device within the the exhaust system. Such a device is known as an afterburner. Many of these prior art publications discuss various forms of afterburners, including those dependent upon the use of a catalytic substance within the afterburner, and show various means for controllably adding fresh air to the afterburner to promote oxidation of at least some of these undesirable combustibles in the exhaust gas. The environment of this invention, including an air addition means selectively providing just the right amount of fresh air, is relatively complex.

Since both the engine throughput (air and combustibles passing through the engine in a given unit of time) and the relative amount of excess combustibles compared to oxygen molecules available for completely oxidizing these combustibles vary considerably during various engine operating conditions, the necessary amount of fresh secondary air addition required to obtain an exhaust gas substantially devoid of these undesirable combustibles will vary.

There are several factors that determine the proper amount of fresh air to be supplied, the concentration of excess combustibles, the total afterburner throughput, and the need to exercise certain protective control functions. Excess combustibles may be defined herein as any combustibles which would remain in the burned exhaust gas after complete utilization of all available oxygen molecules in a complete reaction of the air-fuel mixture supplied to the engine. The amount of fresh or secondary air addition required for complete oxidation of any specific volume or weight of exhaust gas may normally vary by as much as 35 to 1. Moreover, the exhaust gas flow rate (engine throughput) varies by a factor of as much as 20 to 1 depending upon the operating conditions of the engine, such as high speed full-throttle operation or idle operation, respectively. The air addition flow rate must then be controlled in response to these two factors.

In addition to the provision of a proper amount of fresh air, there is a problem of maintaining the mixture at a reacting temperature with an adequate reaction rate. Many prior art afterburner systems have proved unsatisfactory because of the heat losses from the after burner being greater than the heat release, and thus they fail to maintain the mixture at a suitable minimum reaction supporting temperature (such as 1400° F. or more) for causing the reaction propagation to be at least fast enough to burn (in a combustion chamber of an economically feasible size) the incompletely burned exhaust gas at the contemplated exhaust gas flow rates.

On the other hand, during certain periods of operation, such as deceleration or full-throttle operation, the incompletely burned exhaust gas contains more than enough combustibles to provide sufficient heat release to overcome the heat loss. If uncontrolled, the resulting excess temperatures will tend to damage, destroy components of, or reduce the useful life of the afterburner itself.

Thus, not only must the temperature be controlled carefully to insure the provision of a hot reaction at all times, but also within the over-all afterburner system it is desirable to provide means for limiting the maximum temperature to protect afterburner materials from heat damage. One approach for limiting a maximum temperature of a device is to increase the heat loss of the system, while a second approach is to decrease the heat release of the system. The first approach of increasing the heat loss can be attempted by the addition of excess amounts of cool air and/or by major controlled modification of the insulation of the after burner system. The addition of excess cool air requires the delivery of large volumes against a high back pressure during full-throttle (acceleration) operation, and is difficult to do at a low cost. The approach of increasing the heat loss of the system may also be accomplished by modifying the characteristics of a preheating heat exchanger within the afterburner to reduce its effectiveness during high temperature operation. The second approach of reducing the heat release is the subject matter of the present invention and is accomplished by controllably reducing the reaction-supporting oxygen component supplied to the afterburner system.

Recognition of the need to reduce heat release, particularly in afterburner systems connected to improperly tuned engines and carburetion systems, has led to examination of phenomena relevant to abnormal combustion mixtures and incomplete combustion reactions.

Careful study of high temperature combustion reactions of a mixture containing a slight excess of combustibles, compared to oxygen molecules, indicates that the more complex molecules, such as the hydrocarbons, tend to burn in several stages, thus breaking down into simpler combustibles such as hydrogen and carbon monoxide. Moreover, it has been found that only the more complex hydrocarbon combustibles (olefins) contribute to the production of irritating smog, while the simpler hydrogen and carbon monoxide combustibles do not.

With these problems in mind and in accordance with the present invention, it has been found that limiting of the fresh air supply during inherently high temperature operation of an afterburner to a rate less than that which will cause complete oxidation of the incompletely burned exhaust gas results in a burned exhaust gas free of smog-producing compounds, while at the same time limiting the maximum temperature by reducing the heat released. Such a system is usable with an air addition system normally supplying the proper amount of air to enhance complete reaction, whereby any reduction of the air supply will reduce the heat released.

Accordingly, one of the most important objects of the present invention is to provide a simple and reliable afterburner system having a fresh air addition means controlled to allow combustion of all smog-producing compounds and wherein the maximum temperature of the afterburner system is limited by reducing the addition of fresh air.

Another object of the present invention is to provide a simple and reliable temperature-controlling, fresh air addition system for an afterburner.

In the present invention, these objects will be carried out in combination with an afterburner air addition control and supply means responsive to fresh air flow rate determining factors indicative of the air addition required to oxidize all combustibles within the exhaust gas so that normally fresh air will be provided to an afterburner in accordance with these factors. According to the present invention, means are provided to detect abnormal maximum temperatures within the afterburner system and are operatively connected to reduce the effectiveness of the fresh air addition means during such maximum temperature operation of the afterburner.

Briefly, in one embodiment of the present invention, temperature control means are connected to limit the fresh air flow rate delivered by the air addition means as a function of the temperature of the afterburner system whereby, during high afterburner temperatures, not all of the combustibles will be completely burned and therefore will not provide the theoretical maximum rate of heat of combustion release of the combustibles presented to the afterburner system. This reduction of heat of combustion will reduce the heat released in the afterburner system to protect components thereof from excessive temperature damage, without materially increasing the exhausting of the more complex smog-producing compounds.

The subject matter which is regarded as this invention is particularly pointed out and distinctly claimed in the concluding portion of this specification. The invention, however, as to its organization and operation, together with further objects and advantages thereof, will best be understood by reference to the following description taken in connection with the accompanying drawings in which:

Although not limited to automotive throttle-controlled internal combustion engines, certain data relevant to this invention has been obtained from tests on a recent model automobile and will be so described. Moreover, since the present temperature control invention functions well with an air supply means having a known flow rate characteristic, the air supply means will also be described in some detail.

Figure 1:
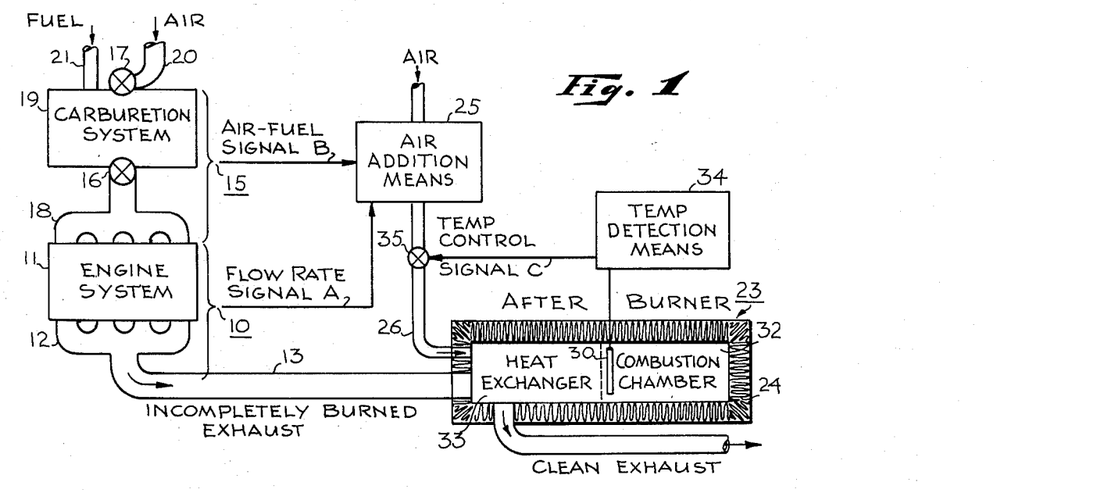
FIGURE 1 shows a simplified block diagram of one embodiment of the present invention.

Referring now to the drawings, wherein like numerals refer to similar parts, there is shown in FIG. 1 a specific type of incompletely burned exhaust-gas producing device including a throttle-controlled internal combustion engine system 10. A carburetion system 15, for regulating the throughput (air and fuel flow rate) of the engine system 10, receives air through an air inlet conduit 20, and hydrocarbon type fuel, such as gasoline, through a fuel inlet conduit 21. In the following discussion an "engine system" refers to an engine 11, an exhaust manifold 12, an exhaust pipe 13, and internal engine components not specifically illustrated. The carburetion system 15 is intended to include such elements as a throttle valve 16, a chock valve 17, an intake manifold 18, a carburetor 19, and various carburetor valves and jets within the carburetor 19 which are not specifically illustrated.

The incompletely burned exhaust gas passing from the engine system 10 by way of the exhaust pipe 13 goes to a combustion or reaction device referred to herein as an afterburner 23, where the combustibles are reacted with fresh air supplied from an air addition means 25. Usually such an afterburner 23 will be substantially encased in a layer of thermal insulation 24. Because of the different types of engines and apparatus producing incompletely burned exhaust gases, the exhaust pipe 13 may be considered as a generic source of such incompletely burned exhaust gas to the afterburner 23.

In order to provide a desired rate of fresh air flow, the air addition means 25 is receptive of an incompletely burned exhaust gas flow rate power signal A from the engine system 10. The flow rate signal A may be obtained from a fluid flow meter or turbine (not shown) in the exhaust pipe 13. Also the air addition means 25 is receptive of an air-fuel mixture ratio control signal B from the carburetion system 15. The signal B may be obtained as a function of a fluid flow meter in the fuel inlet conduit 21. As a result of these power and control signals (A and B), the air addition means 25 supplies fresh air through a fresh air conduit 26 to the afterburner 23 at a fresh air flow rate in accordance with the flow rate of the excess combustibles within the incompletely burned exhaust gas supplied to the afterburner 23. Such an air addition means and signals A and B which are used to produce desired additional signals which are functions of the signals A and B are explained in greater detail in the copending application for Letters Patent, Serial No. 806,645, filed April 15, 1958, by Allan B. Schaffer and Stuart L. Ridgway, and assigned to the assignee of the present application.

In accordance with the present invention, for providing a desired flow rate of fresh air to control the maximum temperature of the afterburner 23, the effectiveness of the air addition means 25 is further modified. As shown in FIG. 1, a temperature-sensing element 30 is placed within the afterburner 23 and provides a signal indicative of the temperature of the combustion chamber 32. The temperature signal is supplied to a transducing means shown as a temperature detection means 34 to convert the temperature signal into a force usable to further modify the flow of fresh air to the afterburner 23.

As will become apparent, limiting of the maximum temperature during burning of the more inflammable mixtures makes it safe to use a most effective heat exchanger 33 to maintain a proper temperature for burning of the less inflammable mixtures. Since an efficient heat exchanger must be used to maintain a high-minimum acceptable temperature (1400° F. or more) during the conditions of minimum heat supply (combustibles) to the afterburner system, it will tend to cause excess temperatures when a greater rate of combustibles is presented. The particular means of further modifying the flow of additional fresh air is illustrated in FIG. 1 as a control valve 35 operable by the temperature detection means 34 to reduce the effectiveness of the fresh air conduit 26 in accordance with the maximum temperature sensed.

Thus, when a maximum desired temperature of the afterburner 23 is sensed, the valve 35 is operated by a temperature control signal C to reduce the effectiveness of the conduit 26 and thus reduce the effectiveness of the air addition means 25 so that not all of the combustibles may react completely. As a result, a portion of the simpler combustible compounds, such as hydrogen and carbon monoxide, will pass through the afterburner 23 unreacted. This method of operation limits the heat release of combustion. On the other hand, if burned, these simpler combustibles (which pass through unreacted) would normally produce some additional heat. In operation, the temperature-sensing apparatus and control arrangement 30, 34, and 35 causes a reduction of the heat released during combustion within the combustion chamber 32 to protect the afterburner components from heat damage whenever a maximum temperature is detected therein.

Obviously, such a safety measure is desirable. More important, as explained in connection with FIG. 2, such operation is entirely feasible while still maintaining a maximum elimination of smog-producing compounds (especially olefins).

Figure 2:
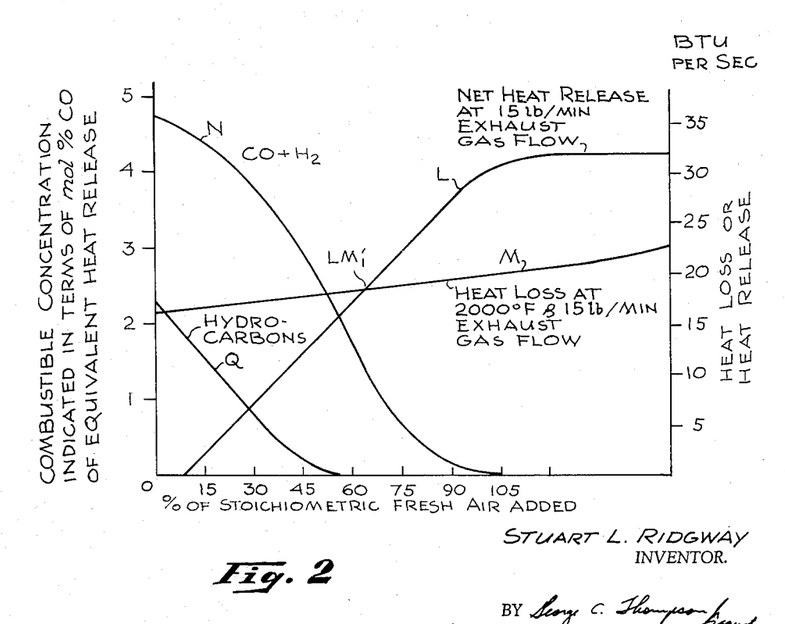
FIG. 2 shows curves of the several characteristics of an afterburner system plotted against the relative rate of addition of fresh air.

Referring now to FIG. 2, there are shown curves of various characteristics within the afterburner system operating at a specified maximum internal temperature such as 2000° F., with the scale of the abscissae indicated in percent of stoichiometric fresh air addition (a 100% stoichiometric fresh air addition being defined as containing just enough oxygen to react with all of the combustibles present). The scale of the ordinates is indicated on the left in combustible concentration indicated in terms of mol percent CO equivalent heat release, and on the right in terms of net heat loss or heat release in B.t.u./sec. during combustion in the afterburner. The particular set of curves illustrated in FIG. 2 is selected to be representative of the operation of the afterburner system during an instant when the mixture supplied by the carburetion system 15 to the engine system 10 is of a specified magnitude and composition and is rich in combustibles. The mixture chosen is typical of wide-open throttle operation at high speed, and the scale of heat release has been selected for the case of an engine having a throughput of 15 lbs./min.

In FIG. 2 there are illustrated, as a function of the air addition, curves of the heat equivalent in terms of CO concentration heat release in the exhaust gas. The curve Q is representative of the more complex hydrocarbon molecules, and the curve N is representative of the simpler combustibles, such as carbon monoxide and hydrogen. It should be noted that upon the passage of engine exhaust gases into a 2000° F. temperature chamber without the addition of fresh air, a substantial portion of the more complex hydrocarbons, including olefins, will be oxidized. The oxidation results in a chemical reduction of carbon dioxide and water and an increase in carbon monoxide and hydrogen in the exhaust leaving an exhaust port of the chamber. Since the engine exhaust gas does not contain sufficient oxygen to produce sufficient heat release to continue oxidation, it is necessary to provide fresh air.

As shown in FIG. 2, when increasing amounts of fresh air are added, the hydrocarbon content of the burned exhaust gas is reduced sharply and becomes of little consequence beyond the region of 50% to 60% of stoichiometric fresh air addition. The carbon monoxide and hydrogen content decreases to a minimal amount as fresh air is added in the region of 105% stoichiometric.

The curves illustrated in FIG. 2 are dependent upon the provision of a sufficiently large combustion chamber 32 within the afterburner 23 to allow a complete reaction therein at contemplated exhaust gas flow rates. A more complete consideration of the required size of the various components of the afterburner unit itself is set forth in my copending application, Exhaust Control Method and Apparatus, Serial No. 677,078, filed August 8, 1957, assigned to the assignee of the present application, and now abandoned. As explained herein and in said copending application, the heat transfer capacity of the heat exchanger 33 is made sufficient to maintain the temperature of the incompletely burned exhaust gas presented to the combustion chamber 32 sufficiently high to support a reaction speed allowing a complete reaction in the particular size combustion chamber provided.

When the above afterburner parameters are met, the limiting of the fresh air in accordance with the present invention will result in exhausting a larger amount of carbon monoxide and hydrogen without impairing the combustion of the smog-producing hydrocarbons.

Figure 3:
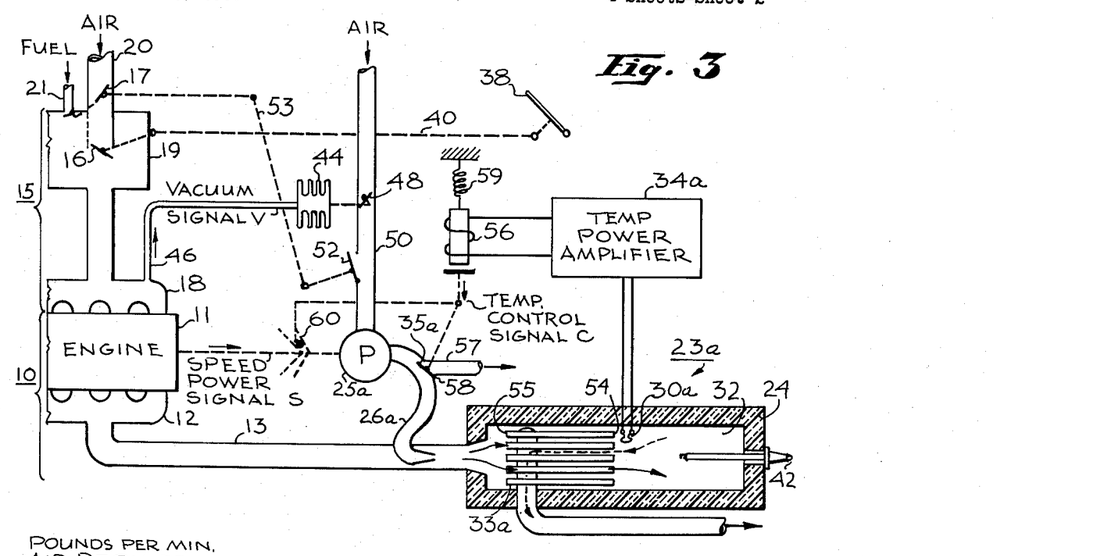
FIG. 3 shows a simplified schematic diagram, partially in section, of a particular embodiment of the present invention.
Figure 4:
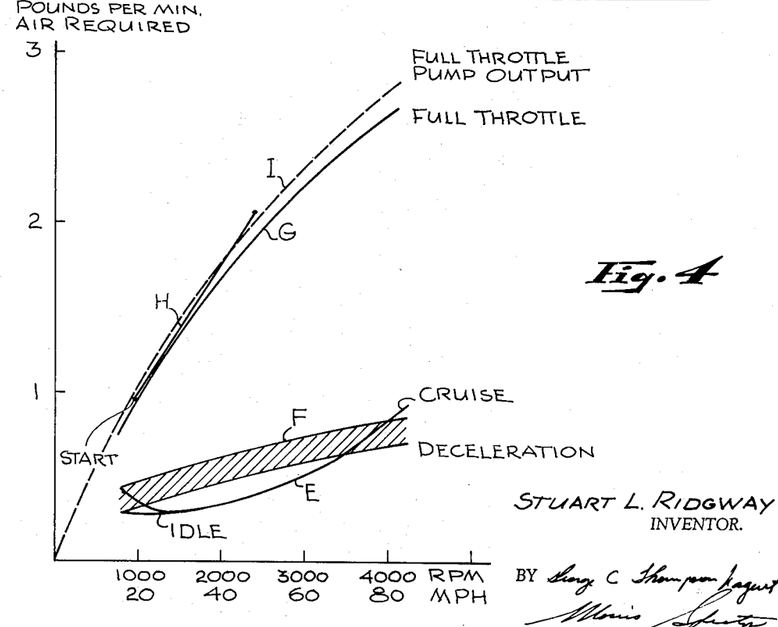
FIG. 4 is a graph illustrating characteristic air addition requirements for a representative afterburner system plotted against engine speed.

Referring now to FIGS. 3 and 4, there is shown in more detail in FIG. 3 an embodiment of the present invention. In order that the invention may be more easily understood, the environment of the present invention is presented in some detail in the following paragraphs.

The engine 11, the intake manifold 18, the exhaust manifold 12, and the carburetor 19 cooperate to exhaust incompletely burned gas into the exhaust pipe 13 which conducts this incompletely burned exhaust gas to the afterburner 23a. In some of the popular carburetion systems, the throttle valve 16 is operable by a foot throttle pedal 38 connected thereto by a linkage 40 and cooperates with the intake manifold vacuum characteristic (created by the pumping action of the engine system 10) to regulate the air-fuel mixture ratio and the engine throughput (being defined as the total air and fuel flow through the engine) in accordance with known principles of carburetor operation. As a result, the air-fuel mixture ratio supplied to the engine 11 through the intake manifold 18 will vary in accordance with the speed of the engine 11 and the position of the throttle valve 16. It is well known that the operation of the carburetion system 15 is relatively complex. The details of carburetor construction and theory of operation, being well known in the art, need not be fully explained herein. However, it should be kept in mind that the engine throughput, the engine speed, the throttle valve position, the intake manifold vacuum, the excess combustible flow rate, and the air-fuel mixture ratio are all interdependent.

Referring now to FIG. 4, there are shown curves of characteristic air addition requirements in pounds per minute to obtain a 100% stoichiometric mixture in an afterburner system receptive of incompletely burned exhaust gas from a modern throttle-controlled 280 cubic inch displacement internal combustion engine. In FIG. 4 the scale of the abscissae is engine speed in r.p.m., and the scale of the ordinates is air addition requirement (which is proportional to the excess combustible flow rate) in pounds per minute. The engine throughput varies as a function of the engine speed and the carburetor operation; also the air-fuel mixture ratio resulting in the flow of excess combustibles is a function of the engine speed and the carburetor operation. Thus the air addition requirements vary, with the air addition requirements during the cruise operation lying along a curve E, the air addition requirements during the deceleration operation lying within the shaded area F, and the air addition requirements during the full-throttle acceleration lying along a curve G. An indication of one of the complexities of the carburetion system is represented by the thickness of the deceleration operation air requirements (F), which is representative of the range of fresh air (excess combustibles) flow rate variation dependent upon the operation just prior to operation in the deceleration region. This is caused by the fuel wetness of the intake manifold prior to deceleration since it is this fuel released from the manifold upon the occurrence of high vacuum during deceleration that causes the variations represented by the shaded area of curve F. It should be noted that the carburetion and engine systems are often operated in acceleration regions which are between the curves E and G. Another complexity is indicated by the blending of the cruise curve E into a relatively thick idle region of operation which tends to vary as a function of the temperature of the carburetion system 15. The additional curve H is shown indicating that during the starting of the engine system 10 operation of the choke valve 17, which is usually automatic, causes a rich air-fuel mixture ratio whereby the fresh air addition requirement follows the curve H.

It is readily apparent from the curves of FIG. 4 that the speed of the engine 11 determines where on one of the operation curves the flow rate of excess combustibles will lie, and thus what should be the output of a pump system supplying oxygen-containing fresh air. The reason for such a relationship becomes readily apparent when it is realized that, pneumatically, the engine 11 itself is a modified positive displacement pump. By providing another pump-type air addition means having proportional output characteristics and driving it as a function of engine speed, one may readily determine the proper rate of fresh air addition by determining the particular "regime" of operation (regimes being defined as the operating conditions of the engine represented by the curves E, F, G, and H) of the engine and carburetion systems and modifying the pump means output accordingly. Such a pump means 25a is shown in FIG. 3.

The desired maximum output of this pump means 25a is shown by a dashed line I in FIG. 4. It should be noted that the dashed line I representative of the pump output lies slightly above the maximum air addition requirements during the full-throttle regime of operation (curve G) of the engine system 10. By driving the pump means 25a directly from the engine crankshaft with a "speed power signal" S, it is feasible to provide fresh air at a flow rate proportional to the full-throttle flow rate of combustibles.

Although the exhaust gas flow rate signal A (as indicated in FIG. 1) is directly measurable by pneumatic flow rate measuring devices, such as by detecting the pressure drop across the carburetion system air filter (not shown), and the air-fuel mixture ratio signal B is directly determinable by measuring the rate of flow of fuel to the carburetion system 15 and comparing it with the exhaust gas flow rate or the air flow rate to the engine system 10, it may prove preferable to utilize the above-mentioned speed power signal S and a manifold vacuum control signal V because of the mechanical power readily available as a function of these signals. For this reason, these signals S and V are illustrated in FIG. 3.

As will become apparent when the engine and carburetion systems are understood, because of the previously mentioned interdependence of engine speed, manifold vacuum, throughput, and air-fuel mixture ratio, the "speed power signal" S (FIG. 3) is primarily indicative of the exhaust gas flow rate (A of FIG. 1) and secondarily indicative of the air-fuel mixture ratio (B of FIG. 1); and the manifold vacuum signal V is primarily indicative of the air-fuel mixture ratio (B of FIG. 1) and secondarily indicative of the exhaust gas flow rate (A of FIG. 1).

In order to substantially match the fuel-air supply to other operations than full throttle, the pump means 25a output is reduced responsive to the operation of the carburetion system 15. During the various operating conditions of the engine system 10 and the carburetion system 15, the vacuum within the intake manifold 18 varies from one operating condition to another. During the deceleration, the manifold vacuum is sometimes as great as 25" Hg, while during the full-throttle operation the manifold vacuum is often as low as 1" Hg. During a cruise, a typical manifold vacuum will be approximately 14" to 18" Hg and during idle a normal manifold vacuum will be between 18" and 20" Hg. Moreover, since in most carburetion systems the operation of the power fuel jets and the various other fuel jets is a function of the manifold vacuum, it has been observed that the richness of the air-fuel mixture ratio in terms of the regime of operation will be indicated by the manifold vacuum.

To take advantage of this manifold vacuum signal V indicative of the richness of the air-fuel mixture and reduce the effectiveness of the fresh air addition pump means 25a to match the curves E, F, or intermediate types of operation during relatively lean air-fuel mixture ratios, a vacuum-sensing device such as a diaphragm and bellows arrangement 44 is connected to the intake manifold 18 by a vacuum conduit 46. Expansion and contraction of the bellows 44 will control the position of a fresh air addition throttle valve 48 within an air inlet pipe 50 to throttle the pump means 25a and thus reduce selectively its effectiveness. Thus, by the utilization of known fluid mechanics principles, during a given pump speed of operation, the arrangement of the fresh air throttle valve 48 is such that the air inlet pipe 50 is restricted during the cruise regime (E of FIG. 4), partially restricted during the deceleration operation (F), and open during the full-throttle operation (G).

It should also be noted that the starting regime curve H lies below the curves G and F so that the fresh air throttle valve 48 should be at least partially disabled during operation of the choke valve 17. This is accomplished by simply opening a second by-pass valve 52 by an operating linkage 53 connected between the choke valve 17 and the by-pass valve 52.

In the above paragraphs a relatively simple yet acceptable air addition system has been disclosed primarily to define a portion of the problem with which the present invention deals. This air addition system normally operates to provide fresh air at a rate proportional to the flow rate of the excess combustibles presented to the afterburner 23a.

A more complete understanding of the problem solved by the present invention requires presentation of at least some of the phenomena encountered in the art of flame propagation within incompletely (partially) burned exhaust gas which normally contains far more inert matter than is present in usual laboratory fuel, such as propane or natural gas, supplied to a conventional burner. Such inert matter includes a large portion of completely reacted products of combustion, such as carbon dioxide and water, with the result that the relative density of combustibles and oxygen molecules is greatly reduced. However, this reduced density of combustibles and oxygen molecules may be at least partially compensated for by increasing the temperature of the mixture to increase the activity of the reactable molecules.

In conducting various laboratory and field tests in the art of afterburners and studying the phenomena of flame propagation, it has been observed that various mixtures of combustibles and oxygen will support combustion at different temperatures, with the density of the reactable matter being an inverse function of a suitable reaction temperature. Thus, one of the most critical parameters of the afterburner art is the temperature of the mixture presented to the afterburner combustion chamber 32. Concurrently, in an incompletely burned exhaust gas and fresh air mixture, the speed of reaction propagation will vary as a complex function of the rate of flow of combustibles and the temperature of the mixture. Because of the problem of maintaining a combustion-supporting temperature within the afterburner 23a during the cruise operation, wherein the relative combustible content of the exhaust gas is small, it is necessary to extract a major portion of the heat released during combustion within the afterburner to preheat the incoming fresh air and incompletely burned exhaust gas mixture without appreciable loss of heat in the heat exchanger section 33a of the afterburner.

The partiuular heat exchanger 33a illustrated in FIG. 3 is of the countercurrent flow recuperative type such that burned exhaust gas (at a temperature such as 1400° F. or more) effectively imparts heat to the heat exchanger 33a and is presented to one end 54 of the heat exchanger 33a which is adjacent the combustion chamber 32, while incompletely burned exhaust gas to be heated by the heat exchanger 33a is presented at the other end 55. The heat exchanger 33a is designed to have a heat transfer characteristic capable of maintaining a minimum temperature within the combustion chamber 32. The minimum temperature is above a desirable ignition temperature of the incompletely burned exhaust gas having the lowest relative content of combustibles. For relatively modern large automotive engine systems, the active heat exchanger surface area of such a heat exchanger 33a will be on the order of 25 square feet or more, and the thickness of the passages between the active surfaces will be on the order of .1 inch or less. The heat conductive material pneumatically separating the counterflow gas streams is made of a minimum convenient thickness. When a stainless steel separating material is used, the thickness may be on the order of .02 inch. Such an arrangement is designed to provide at least a desired minimum heat transfer capacity and a heat transfer effectiveness sufficient to maintain the temperature of the incompletely burned exhaust gas leaving the hot end 54 of the heat exchanger 33a during operation of the engine 11 in cruise (curve E of FIG. 4). During the cruise regime, the rate of combustible flow per unit of exhaust gas flow is normally at a minimum, and the heat release per minute is only slightly greater than the heat loss per minute at a minimum acceptable temperature.

Moreover, the heat exchanger 33a provides the additional desired function of a heat storage device to prevent flameout within the afterburner 23a during rapid changes from one regime of operation to another and concurrent lag in relative flow of either combustibles or fresh air. Omission of such a heat storage or "heat reservoir" tends to allow flameout. Thus the heat exchanger 33a provides a valuable means of heat storage.

On the other hand, when the necessarily efficient heat exchanger 33a is provided, and when relatively greater flow rates of combustible material are supplied by the exhaust pipe 13 to the afterburner 23a, the efficient heat exchanger 33a and the heat released during combustion within the afterburner combustion chamber 32 may result in excessive temperatures. The above considerations define in a general way the relevant problems and the environment of the present invention.

In order to determine a temperature most indicative of the maximum permissible temperature within the afterburner system, a heat-sensing device, such as a thermocouple 30a, is positioned within the combustion chamber 32 at a point remote from a starting heater device, such as a spark plug 42. Such a location of the temperature-sensing device will result in an accurate detection of the maximum safe afterburner temperature.

In accordance with the present invention (see FIG. 3), in order to limit the maximum temperature of the afterburner system to protect components thereof from heat damage, the detection of a predetermined high temperature by the thermocouple 30a energizes a power amplifier 34a which includes a voltage-sensitive arrangement and provides the temperature control signal C through a valve-operating device such as a relay coil 56, to cause the opening of the control valve 35a, which will by-pass a portion of the fresh air through a dump conduit 57 to the atmosphere and thus reduce the rate of fresh air supplied to the afterburner 23a. As will be explained in greater detail below in connection with FIGS. 2 and 5, such reduction of fresh air will effectively reduce the heat release within the afterburner combustion chamber 32.

In the particular arrangement illustrated in FIG. 3, the valve 35a is pivotally supported at 58 whereby opening of the conduit 57 will be concurrent with a partial throttling of the fresh air conduit 26a. The maximum temperature control arrangement (30a, 34a, 56, and 35a) is also operable over a range of temperatures, such as 50° F., by the addition of a bias means, such as a spring 59. The temperature control arrangement is adjustable to cooperate with the armature of the relay coil 56 to cause the dumping of 10% of the fresh air at a combustion chamber temperature such as 2000° F. (when ceramic materials are used within the afterburner 23a, or 1700° F. when metal materials are used in the afterburner 23a), 20% of the fresh air at a temperature such as 2020° F., 40% of the fresh air at a temperature such as 2040° F., and 60% of the fresh air at a temperature such as 2050° F. Such a reduction of fresh air will reduce substantially the heat released (curve L of FIG. 2) by the reactions occurring within the combustion chamber 32.

As mentioned above, FIG. 2 depicts a static condition of operation of the engine system 10 for the purpose of explaining the operation of the temperature control arrangement. If no fresh air is added during the particular set of conditions illustrated in FIG. 2, the heat release shown by curve L is approximately zero and in some cases may be slightly negative because of the chemical reducing of both carbon dioxide and water by the hydrocarbons within the exhaust gas. The heat release curve L rises steadily and linearly as the fresh air addition is increased, until the air addition approaches that required for providing a stoichiometric mixture to the afterburner 23. This is because, at the temperature (2000° F.) of operation under consideration, below 90% of the fresh air necessary to provide a stoichiometric mixture, practically all of the oxygen presented will react. However, above 90% stoichiometric air addition the heat release curve L curves in to the maximum which is determined by the amount of combustibles available other than oxygen.

It can be seen in FIG. 2 that the heat loss curve M shows a dependence of the heat loss on the amount of fresh air added. This dependence is due to the fact that, as the air addition increases, the temperature difference across the heat exchanger must increase in order to provide the preheating of the input mixture, including the relatively cool fresh air, to maintain the reaction-supporting temperature. As defined herein, the dynamic heat loss is proportional to the throughput times the temperature difference across the heat exchanger. In addition, there is the further effect that, as the fresh air supply is increased, the temperature of the incompletely burned exhaust gas and fresh air mixture supplied to the heat exchanger 33a is less, and therefore the temperature rise along the heat exchanger is increased, also demanding a greater temperature differential across the heat exchanger to derive the necessary heat transfer. Thus the heat loss curve M has a slight positive slope, while the heat release curve L has a much greater slope.

As shown in FIG. 2 (at 105% stoichiometric air addition) and as explained in more detail in connection with FIGS. 5, 5a, 5b, and 5c, the use of the necessarily efficient heat exchanger 33a can result in the heat release (L) being on the order of 50% greater or more than the heat necessary (heat loss curve M) to raise the temperature of the afterburner throughput to a maximum desired reaction propagation supporting level. At an intermediate fresh air addition rate in the region of 75% to 60% of that required for a stoichiometric mixture, the heat release is decreased and only slightly greater than the heat loss. Where the curves L and M intersect, at about 19 B.t.u./sec. for the specified operating condition, as at $LM'_1$, the afterburner temperature is maintained in equilibrium at a constant desired level.

Because of the relative slopes of curves L and M, when the fresh air addition is reduced below 60% of a stoichiometric mixture, a definite cooling effect by reduction of the heat release is noticed; that is, the heat loss at a specific temperature and flow rate is greater than the heat released. Below 60% of stoichiometric fresh air addition, the curve M lies above the curve L (FIG. 2). By reference to the above discussion of the maximum temperature control arrangement (components 30a, 34a, 35a, 56, and 59 of FIG. 3), which will reduce the effectiveness of the air supply means by 40% at 2040° F., it becomes apparent that for the particular air-fuel mixture ratio and throughput producing the curves of FIG. 2, wherein at 2040° F. and 60% stoichiometric air addition, the heat loss equals the heat release at $LM'_1$, the maximum temperature attainable in the temperature controlled afterburner 23a is 2040° F.

It should be noted that the curves L and M will be influenced materially by changes in air-fuel mixture ratios, engine throughput, and afterburner combustion chamber volume, as well as by the heat transfer capacity of the heat exchanger 33a. For instance, if the combustible content of the incoming exhaust gas is reduced over those illustrated in FIG. 2, as during cruise operation, the heat release of combustion is lowered. Also, if the temperature of the system or the throughput is reduced, the heat losses are lowered. Since it is unlikely that the engine system 10 will remain for long periods in a static operating condition, it is desirable to present a dynamic illustration in terms of net heat losses and net heat released. An engine system may be expected to emit variable amounts of incompletely burned exhaust gas during a normal sequence of engine operating conditions.

Figure 5:
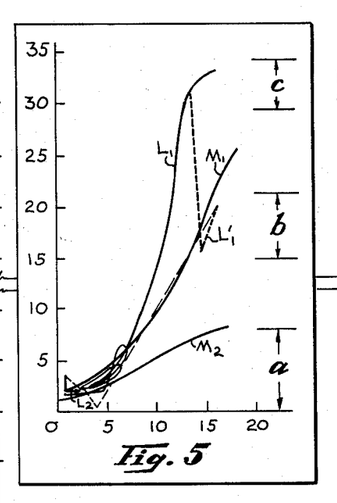
FIGS. 5, 5(a), 5(b), and 5(c) show curves representing heat release and heat loss characteristics in an afterburner system.
Figure 5A:
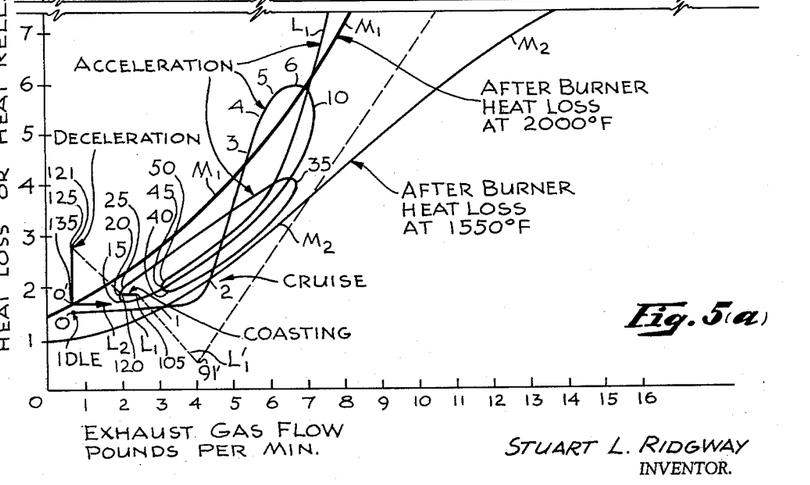
Figure 5B:
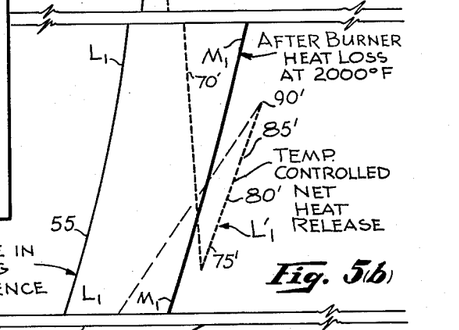
Figure 5C:
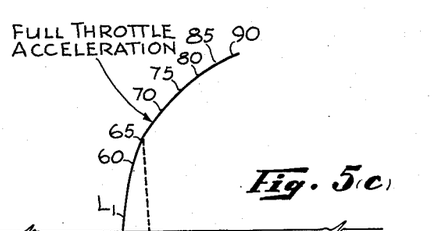

Referring now to FIGS. 5, 5(a), 5(b), and 5(c), wherein the scale of the abscissae is exhaust gas flow rate in pounds per minute and the scale of the ordinates is heat loss or release in B.t.u. per second, FIGS. 5(a), 5(b), and 5(c) are enlarged sections of the portions a, b, and c of FIG. 5, which portions are of interest in the present discussion. In FIG. 5 there are shown curves which depict net heat balance characteristics of a normal and dynamically varying incompletely burned exhaust gas flow from the engine system 10 to the afterburner 23a. A curve $L_1$ shows a variable heat release track during a representative operation of the engine system 10, and the curves $M_1$ and $M_2$ show the heat losses of the afterburner 23a at two specific temperatures and varying engine throughputs. The curve $M_2$ represents the total heat loss per second at a minimum acceptable afterburner temperature, such as 1550° F.; the curve $M_1$ represents the total heat loss per second at a maximum acceptable operating afterburner temperature, such as 2000° F.; and the curve $L_1$ represents heat released per second during the combustion of the incompletely burned exhaust gas and fresh air mixture presented to the afterburner 23a.

The heat losses include two different types of heat losses, one being the heat loss through the insulation of the afterburner system, which is primarily a function of temperature. This loss is relatively constant when the temperature is fixed and the insulation coating 24 is maintained. This "static" heat loss determines the minimum value of the curves $M_1$ and $M_2$. The other type of heat loss is caused primarily by the difference in temperature between the incompletely burned exhaust gas presented to the heat exchanger 33a and the completely burned exhaust gas flowing from the heat exchanger 33a. This loss is a "dynamic" function of the flow rate and is approximately a quadratic function of the flow rate because temperature differential needed increases as the exhaust gas flow rate increases. However, the quadratic function is modified by the fact that the temperature of the incompletely burned exhaust gas presented to the exchanger 33a also increases as the flow rate increases so that the necessary heat rise within the heat exchanger 33a is reduced at high flow rates.

The dynamic loss for this discussion is defined in the following way. The afterburner of FIG. 3 has two connections at the cool end 55 of the heat exchanger, an input and an output. The dynamic heat loss is defined as the excess of sensible heat in the exhaust gas flowing from the output less the sensible heat flowing to the input. This excess, for steady state operation, is clearly the product of the mass flow of the exhaust gas and air mixture, times the specific heat thereof, times the temperature difference between the output and the input gas streams. This temperature difference is the difference that induces the heat transfer in the heat exchanger. In addition to being a function of the heat transfer capacity of the heat exchanger, in the simple case of the counter-current recuperative heat exchanger 33a, the temperature difference is proportional to the temperature rise from the cold end 55 to the hot end 54 of the heat exchanger, and is also proportional to the mass flow rate through the heat exchanger. Therefore, since the temperature difference is approximately proportional to flow rate, and the heat per unit temperature difference is proportional to flow rate, the approximately parabolic form of curves $M_1$ and $M_2$ is evident in FIG. 5. As shown, the heat loss curve $M_1$, for the combustion chamber temperature 2000° F., lies considerably above the curve $M_2$, for the temperature 1550° F.

The heat transfer characteristic of the heat exchanger 33a is selected to operate proficiently at flow rates during the cruise regime. Thus, during cruise operation the heat loss, curve $M_2$, will be compensated for by the heat release $L_1$. In FIGS. 5(a), 5(b), and 5(c), the heat release track curve $L_1$ is marked in seconds for purposes of explanation.

The heat release track curve $L_1$ of FIGS. 5, 5(a), 5(b), and 5(c), as discussed in detail below, gives the history of the heat release per second during a trip. During this trip, an automobile is accelerated (at 0 seconds) from a stoplight and is driven through a 25 m.p.h. speed zone (1–30 seconds) through a 35 m.p.h. speed zone (35–50 seconds), up a step quarter-mile long hill at 55 m.p.h. or more (60–90 seconds); over the top of the hill (91–120 seconds; down a slope (121–125 seconds); and braked for a stop sign (126–135 seconds). The total distance covered in such a trip is about 1.4 miles.

Referring now to the heat release track curve $L_1$, the point "0" of FIG. 5(a) represents an instant when an automobile utilizing an afterburner (which has been preheated by prior operation) is initially accelerated at a relatively slow rate by depression of the throttle foot pedal 38. As the speed of the engine 11 increases through seconds 1–10, the throughput of the engine system increases, and the heat release track curve $L_1$ and heat loss of the afterburner increase accordingly. The average heat release of the heat release track curve $L_1$ (0–10 seconds) is sufficient to maintain the afterburner temperature within the region of 1550° F. to 2000° F.

Because of the thermal inertia of the afterburner system, the temperature remains within the desired region despite the fact that during the second second the fuel flow through the carburetor was less than necessary to provide combustibles to maintain a desired operating temperature, and the fact that during the sixth second the automobile was accelerating so that some excess heat was provided. During the period of 0–2 seconds, the throttle valve 16 is opened, and the air throughput increases more rapidly than the fuel flow. Thus the heat release stays relatively constant, while the heat losses increase rapidly. From 2–10 seconds, the throttle valve 16 is still open, and the fuel flow increase rapidly, while the engine throughput increases less rapidly. During this period (2–10 seconds) the automobile is accelerating. As the automobile approaches the desired cruise speed (10–15 seconds), the operator partially closes the throttle valve 16, and both the fuel and the exhaust gas flow rates are reduced, thus reducing the heat released as well.

Next, the automobile is operating in a moderate cruise regime at a relatively constant throughput so that during the period of 15–25 seconds the average heat release during combustion is sufficient to maintain the afterburner at a temperature of approximately 1750° F. In the period of 25–35 seconds, the automobile is accelerated slightly to a higher cruise speed whereby the throughput is increased. As the desired speed is approached, the throttle valve 16 is again partially closed, resulting in the 35–40 second curve portion response similar to the 10–15 second portion.

Next, the automobile, in the period of 40–50 seconds, is operated at a relatively constant higher cruise speed. Both the heat release and the heat loss are also increased, with the average temperature remaining at a slightly lower magnitude on the order of 1650° F.

During the period of 50–90 seconds, the particular automobile operation depicted by the heat release track curve $L_1$ FIGS. 5(b) and 5(c) is rich in combustibles, indicating both acceleration and heavy loading such as occur during acceleration up a steep grade. During such operation the heat release track curve $L_1$ is substantially above that necessary to maintain the afterburner at a temperature of 2000° F. despite the increased heat losses $(M_1)$ at such increased throughputs.

Although there is substantial thermal inertia in the afterburner system, after some period, such as 10–12 seconds of operation in this elevated heat release region (50–90 seconds), the temperature of the afterburner $23a$ will reach 2000° F. or more, at which time the heat limiting by reduction of the fresh air flow is accomplished. This is accomplished, as discussed in connection with FIGS. 2 and 3, by detecting the preselected maximum temperature and reducing the effectiveness of the air addition pump means $25a$. Thus, instead of following the solid line ($L_1$ of FIG. 5(c)) during the period of 65–90 seconds, the heat release is reduced, as represented by the new heat release line $L'_1$, by the limiting of the fresh air addition. The heat release falls off as shown by the dashed line ($L'_1$ of FIG. 5(b)) to a point indicated by 75' sec., at which reduced temperature control of the fresh air is provided and air added is again increased. Also it should be noted that the reduction of the air reduces slightly the slope of the heat losses as illustrated by the slight slope of the curve M of FIG. 2. This reduction would also provide a new loss curve (not shown) in the curve in FIG. 5(b) below the maximum curve $M_1$. The reduction of fresh air causes the new heat release curve $L'_1$ to be equal to or less than the new heat loss curve (not shown) to maintain a desired temperature during the 75' to 90' second vehicle travel period.

At the end of the 90 seconds of operation, the throttle valve 16 is moved quickly to a nearly closed position, and the automobile is allowed to coast at a relatively high speed for several seconds (90 to 120 seconds). Thus the fuel flow is sharply reduced and the heat losses $(M_1)$ exceed the heat release track curves $L'_1$ and $L_1$, whereby the heat stored in the afterburner system is lost at a greater rate than heat is supplied thereto, and the afterburner system cools to below 2000° F. As the heat released falls below the heat losses, temperature control causes less reduction of the fresh air supply and the heat release starts to rise at some point such as 91 seconds on the curve $L'_1$. During the period of 91 to 105 seconds, the vehicle is operating at relatively constant speed with decreasing temperature control of the fresh air supplied and the throttle slowly closing an additional amount. From 105 to 120 seconds, the heat released is constant with no maximum temperature control in action and some additional throttle closure occurring during coasting. Next, the throttle valve 16 is closed quickly (120–121 second period) to cause the heat loss track curve $L'_1$ to follow a deceleration operation having a richer mixture and higher heat release at a throughput of about .75 pounds per minute for a period between 121 and 125 seconds. The vehicle approaches a stop signal and is braked, with the throttle valve 16 still closed, to a stop with the engine going to idle speed during the period of 125 to 135 seconds. It should be noted that the heat release during idle at the start (0 seconds) of the heat release track curve $L_1$ is slightly different than that at the end (135 seconds) of the heat release track curve $L_1$.

A short time later the automobile starts at 0' to follow another heat release track curve $L_2$ which may have similarity to the heat release track curve $L_1$ depicted.

Thus the operation of the embodiment shown in FIG. 3 is defined. However, it is recognized that the above-disclosed theory of operation can be utilized in several distinct types of afterburner and air addition systems.

For instance, although the above discussion sets forth a means ($35a$) of reducing the fresh air flow by dumping a portion of the air pumped, it is recognized that the output of the pump means $25a$ may be regulated by modifying the effect of one of the signals S or V. A simple arrangement for accomplishing modification of the signal S is shown in phantom in FIG. 3 when a variable speed clutch 60 is placed in a lower gear ratio during detection of a maximum temperature by the thermocouple $30a$. The variable speed clutch 60 is operable separately or in combination with the control valve $35a$ to reduce the fresh air output of the pump means $25a$.

Figures 6, 6A:
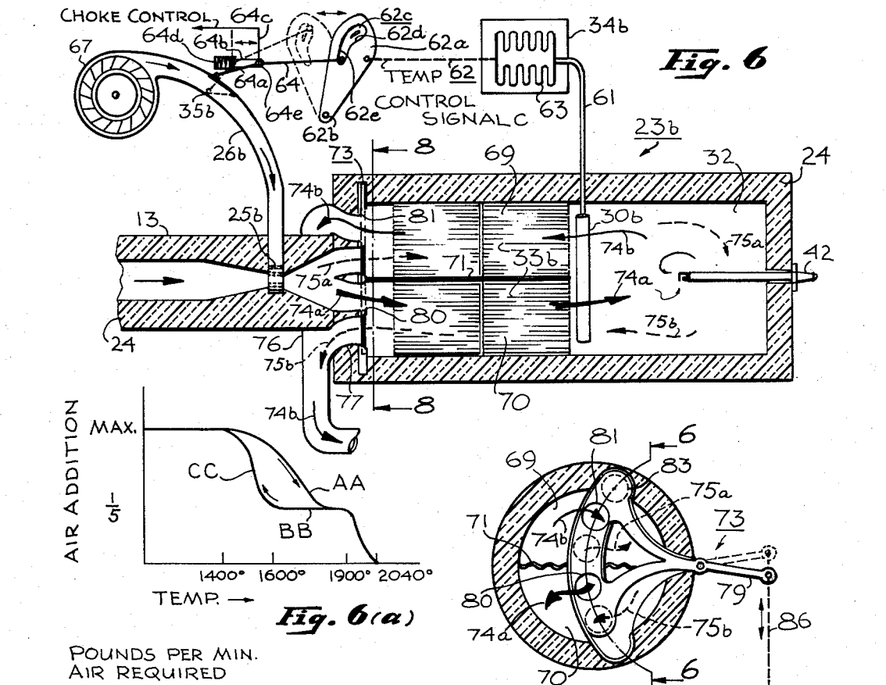
FIG. 6 shows a simplified schematic diagram, partially in section, of another particular embodiment of the present invention.
FIG. 6(a) shows curves of valve action plotted against afterburner temperature.
Figure 7:
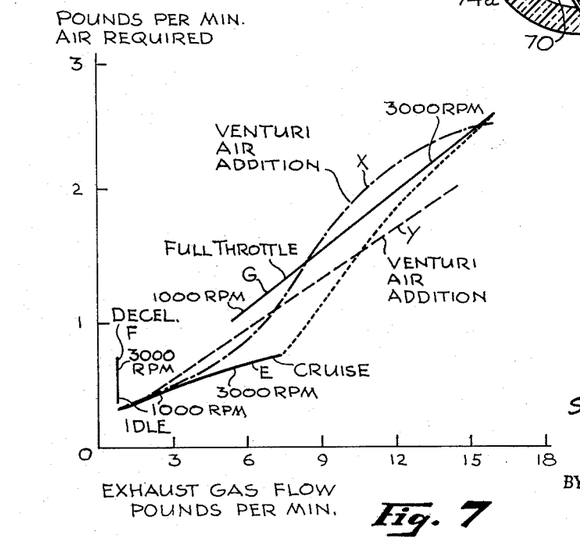
FIG. 7 is a graph illustrating characteristic afterburner air addition requirements plotted against engine throughput.
Figure 8:
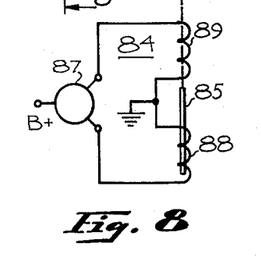
FIG. 8 is a cross-sectional detail view of a valve mechanism usable in the afterburner of the embodiment shown in FIG. 6.

Referring now to FIGS. 6, 7, and 8, there is shown a further embodiment of the present invention, wherein the thermocouple $30a$ has been replaced by a pneumatic temperature-sensitive device comprising a gas-filled chamber $30b$. As the temperature of the combustion chamber 32 reaches a maximum safe value, the pressure of the gas within the temperature-sensing device $30b$ increases and is transmitted by a conduit 61 to cause expansion of a pressure-operable temperature detection transducing device $34b$ including a bellows 63. Expansion of the bellows 63 causes motion of a linkage 62 to displace a cam $62a$ about its pivot point $62b$. The cam $62a$ is provided with a cam slot $62c$ having different cam sections $62d$ and $62e$ for initial and return movements, respectively. The outer junction (remote from the pivot point $62b$) of the sections $62d$ and $62e$ serves to provide lost motion during afterburner operation, as will be explained hereinafter.

When the afterburner is cold, the bellows 63 is fully contracted and the valve $35b$ is fully open for maximum air supply (see FIG. 6(a)). In addition, the linkage $64c$ assures that the engine choke is at least partially closed to provide a rich incoming mixture to the afterburner through the engine. After flame initiation, the temperature rises and the bellows 63 expands, causing rotation of the cam $62a$. Rotation of the cam $62a$ causes the link 64 to be displaced upwardly in the cam section $62d$. When the link 64 reaches the end of the section $62d$, a temperature of approximately 1400° F. is reached, with the valve $35b$ still fully open. Continued movement of the bellows causes the links 62 and 64 to cause the valve $35b$ to move toward closed position until the spring $64d$ is engaged at approximately ¼ to ⅓ of maximum air supply position of the valve $35b$. Upon reaching the 1900° F. temperature level, the choke link $64c$ has moved to a position of ineffectiveness on the choke operation. At this temperature, choke operation is fully under engine needs control only. The spring $64d$ is engaged by the connecting pin $64e$, and the resistance to further bellows movement causes the valve to hold its position until a temperature of approximately 1900° F. is reached. Under normal operating conditions, the temperature of the afterburner will stay below the 1900° F. level due to the restriction of fresh air; however, under some conditions the temperature may continue to rise. At this time, the spring $64d$ is compressed and the valve $35b$ fully closed by the 2040° F. temperature level. The cut-off of fresh air by the valve $35b$ causes a reduction of the burning action and thus a decrease in temperature. As the bellows 63 contracts, the spring $64d$ moves the valve to the ¼ to ⅓ air supply position as the temperature drops to the 1900° F. level. At this point a further reduction in temperature only causes the cam $62a$ to move without further displacement of the link 64 until approximately the 1600° F. temperature level is reached. If the afterburner operation is normal, the temperature will remain between the 1600° F. and 1900° F. levels. However, if flameout occurs, the temperature will drop below 1600° F., and the bellows 63 will contract further, causing further rotation of the cam $62a$ and thus return of the link 64 to starting position through the cam section $62e$. The movement of the cam $62a$ causes the link 64 to move the valve $35b$ toward fully open (maximum air) position and further causes the choke link 64c to move the choke toward closed position, causing a rich mixture in the engine exhaust for restarting the afterburner.

It is pointed out that immediately after starting the afterburner the fresh air supply is controlled to follow the curve portion AA (see FIG. 6(a)). During normal operation of the afterburner, no change in the fresh air supply is provided due to the lost motion area between cam sections 62d and 62e, and the afterburner is operating in the temperature range of 1600° F. to 1900° F. indicated by curve portion BB of FIG. 6(a). Upon shutdown or flameout, the fresh air supply is moved to maximum at a rate dictated by cam section 62e and shown by curve portion CC of FIG. 6(a).

It should be pointed out that the comparison of the selected temperatures with the fresh air supply quantities are merely representative, since these values will vary with each afterburner arrangement.

The embodiment shown in FIG. 6 also differs from that of FIG. 3 in the particular air addition means illustrated as a venturi nozzle 25b instead of the pump means 25a shown in FIG. 3. The particular venturi nozzle 25b illustrated is designed according to known venturi principles to provide air addition, as set forth in FIG. 7, at a rate which is a positive function of the flow rate of the exhaust gas, with the function being approximately five to ten percent additional fresh air compared to the incompletely burned exhaust gas flow rate. Although this simplified system does not take into account all of the possible variations between one engine operating regime and another, it has decided economic advantages. With the above-described temperature control problem, the venturi will be easily controllable for safe temperature of operation and the elimination of smog-producing hydrocarbons during substantially all operating conditions.

Referring now to FIG. 7, wherein the scale of the abscissae is exhaust gas flow in pounds per minute and the scale of the ordinates is fresh air addition in pounds per minute, there are shown on a different base scale the regime of operation curves E, F, and G defined in connection with FIG. 4. The cruise regime (curve E) is of the least slope and terminates in the idle regime at the minium flow rate end and blends, as shown by a dotted line, into the full-throttle regime (curve G) at the maximum flow rate end where the operating conditions cause at least partial utilization of the maximum power jets. In regard to the deceleration regime (curve F), although the exhaust gas flow rate remains substantially at the minimum value, it has been found that high speed deceleration requires slightly more fresh air than does low speed deceleration. As indicated in the curves of FIGS. 4 and 7, the curve G represents the maximum fresh air addition requirement during the full-throttle regime of operations. Moreover, the full-throttle operation does not extend into the idle operation. This is because during idle the throttle valve 16 is closed, while during full-throttle operation the throttle valve is fully open. In order that the curves E, F, and G of FIG. 7 may be compared to those of FIG. 4, each of the curves E. F, and G is marked at 1000 r.p.m. and 3000 r.p.m.

The venturi 25b of FIG. 6 may be designed to have an air addition output characteristic as indicated by the dashed line X (FIG. 7) whereby at low cruise speeds the flow rate of fresh air is very nearly equal to that required to obtain a stoichiometric mixture in the afterburner with maximum temperature control needed at rich mixtures and high throughputs. On the other hand, with some types of carburetion systems, it is feasible to use a modified venturi (similar to 25b) having an air addition characteristic indicated by the dashed line Y (FIG. 7). It should be noted that the output Y selectively provides a reduced air flow compared to the theoretical requirement (curve G, FIG. 7) during full-throttle operation where excess heat release normally occurs. Thus a venturi having an air addition characteristic Y will automatically lower the heat release during maximum acceleration, such as illustrated in FIGS. 5, 5(a), 5(b), and 5(c) during the periods of 4–6 seconds and 55–90 seconds of the heat release curve $L_1$.

In order to provide a most desirable air addition rate with the venturi illustrated in FIG. 6, at low throughputs, there is also provided a small low pressure pump shown as a constant speed fan 67 which directs air into the input end of a fresh air conduit 26b. The centrifugal fan 67 provides an increased air pressure on the order of a few inches, such as 1 to 16 inches, of water gauge whereby a proper addition of air is obtained during the idle and deceleration regimes. Since the suction of a venturi varies as the square of the flow and the afterburner and laminar flow heat exchanger vary linearly, it is obvious that at low throughputs the venturi suction would fall below the afterburner back pressure without the fan 67. Thus, since the engine system 10 has a throughput that is functionally related to the excess combustibles (air addition requirements), it is quite feasible to design the venturi nozzle 25b and the fan 67 to provide air addition at rates which will substantially match the curves X or Y of FIG. 7. The functional relationship between the necessary air addition and the engine throughput is acceptable for these purposes at least to the extent that the full-throttle regime has both the maximum throughputs and the maximum air addition requirements and that the cruise regime has substantially lower throughput and air addition requirements.

FIG. 6 also shows the coating of insulation 24 surrounding the afterburner 23b extended to insulate the exhaust pipe 13. The effectiveness of the insulation 24 will reduce to some extent the heat loss and thus reduce the heat transfer capacity requirement of the heat exchanger 33b. With a well insulated engine exhaust system, the incompletely burned exhaust gas during one condition of operation may be presented to the afterburner 23b as hot as 1000° F. instead of only about 600° F. in a poorly insulated system.

It should be noted that the afterburner 23b itself of FIG. 6 is of somewhat different construction than that shown as 23a in FIG. 3. For instance, although the overall function of the heat exchangers 33a and 33b may be equivalent (to reduce "dynamic" heat loss), the difference in construction allows a substantially different method of operation of the heat exchanger 33b. The heat exchanger 33b is a reverse flow regenerative device having a construction which is nominally a cylinder divided into an upper heat exchanger portion 69 and a lower heat exchanger portion 70, with each of these portions having a semi-cylindrical cross section and being separated by a fluid-separating membrane 71. A heat exchanger operating in accordance with the reverse flow regenerative principle has been tested using a ceramic heat storage regenerator having many small linear passages therethrough. Although an afterburner having ceramic elements will stand temperatures somewhat in excess of 2000° F., it is obvious from FIG. 5 (60 to 90 seconds) that temperature limiting is still necessary during maximum heat release conditions.

In order to obtain a desired reverse flow heat regeneration, a first portion (arrows 74a) of incompletely burned exhaust gas and fresh air will pass through the preheated lower heat exchanger portion 70 and extract heat therefrom on its way to the combustion chamber 32. At the same time, the gas portion 74b passes through the upper heat exchanger portion 69 while imparting heat thereto. During such operation only incompletely burned exhaust gas and fresh air flow through the heat exchanger portion 70 and only burned exhaust gas flows through the heat exchanger portion 69. When the flow reversal apparatus, as exemplified by a valve mechanism 73, is reversed, a next portion of the incompletely burned gas and fresh air (dashed arrows 75a) passes to the combustion chamber through the heated heat exchanger portion 69 while extracting heat therefrom, is burned in the combustion chamber 32, and imparts heat to the heat exchanger portion 70 during its passage therethrough (arrows 75b). Upon leaving the heat exchanger 33b, the completely burned exhaust gas will enter selectively one of the tailpipe lead-in conduits 76 or 77 and be exhausted to the atmosphere.

An operating arrangement for the valve mechanism 73 (shown in cross-section in FIG. 6) is shown in FIG. 8. The particular valving member 79 illustrated for the purpose of defining the reverse flow regenerative heat exchanger 33b has the general appearance of a curved plate defining two apertures 80 and 81. The apertures 80 and 81 are movable with motion of the valving member 79 to be alternately receptive of incompletely burned exhaust gas from the exhaust pipe 13. When one aperture is receptive of incompletely burned exhaust gas, the other is receptive of burned exhaust gas from the combustion chamber 32. The non-conducting conduit portions of the valving member 79 are effectively sealed by the valve cover portions 83. In the position of the valving member 79 as shown in FIGS. 6 and 8, the aperture 80 is receptive of incompletely burned exhaust gas 74, and the aperture 81 is receptive of burned exhaust gas.

Depending upon the heat transfer and heat storage characteristics of the heat exchanger 33b, the valving member 79 is operated periodically to reverse the gas flow in the heat exchanger portions 69 and 70. One simple arrangement for accomplishing a desired operation of the valve mechanism 73 to cause such reversal of gas flow is illustrated in FIG. 8, where a two-position solenoid 84, having a single armature 85 connected by a linkage arrangement 86 to the valving member 79, is operable by a suitable well known timing device 87. When selectively energized, a first solenoid coil 88 actuates the armature 85 and thus positions the aperture 80 to receive incompletely burned exhaust gas from the exhaust pipe 13 and the aperture 81 to receive burned exhaust gas from the heat exchanger portion 69. A short time later a second solenoid coil 89 is energized and coil 88 deenergized whereby the valve member 79 is shifted to allow the aperture 81 to receive incompletely burned exhaust gas from the exhaust pipe 13 and the aperture 80 to receive burned exhaust gas from the heat exchanger portion 70.

With certain types of engine and afterburner systems, the operation of the valve mechanism 73 should be at a rate causing a reversal of exhaust gas flow once every seven to ten seconds. However, a more sophisticated flow reversal control system (not shown herein) utilizes temperature-sensing means in each of the heat exchanger portions 69 and 70 and a temperature-comparing system to reverse the exhaust gas flow whenever the temperature differential exceeds a specific value such as 100° F.

When using high temperature materials, the heat exchangers 33a and/or 33b may become hot enough to cause reaction between the combustibles and oxygen molecules in the hot end 54 of the heat exchanger prior to the entry of the incompletely burned exhaust gas into the combustion chamber 32. As a result, the effective size of the combustion chamber is increased and concurrently the heat exchange and storage capacity of the heat exchanger is effectively reduced. Reduction of the capacity of the heat exchanger will increase the dynamic heat losses during high temperature operation and thus provide an additional temperature-limiting arrangement. When this relationship is utilized in conjunction with the venturi having a characteristic Y or FIG. 7, it is contemplate that the heat release will remain below the heat losses automatically. In a board sense, the occurrence of the above phenomena is a temperature-sensing means—operable only when the heat exchanger end 54 obtains a certain temperature. However, the above-defined temperature control apparatus shown in FIGS. 3 and 6 may be used to limit the temperature below a value at which such reactions within the heat exchanger end 54 will occur.

While there have been shown and described several embodiments of the present invention, other modifications may occur to those skilled in the art. For instance, in addition to the substantially different types of afterburner systems and air addition systems described in FIGS. 3 and 6, it is contemplated that the limiting of fresh air addition to reduce heat release and thus prevent excessive afterburner temperatures is usable in many types of afterburner systems. Also it is contemplated that one of several types of temperature-sensing means 30 or other types of transducing temperature detection means 34 and other arrangements may be operable for reducing selectively the effectiveness of the air addition means 25, so long as the theory of operation set forth herein is followed. Therefore, it is intended by the appended claims to cover all such modifications as fall within the true spirit and scope of this invention.

What is claimed is:

1. An afterburner system connected to receive incompletely burned exhaust gas from an internal combustion engine, comprising: fresh air addition means connected to mix oxygen-containing fresh air with the incompletely burned exhaust gas as a function of the rate of flow of excess combustibles in the incompletely burned exhaust gas; an afterburner provided with a heat exchanger portion and a combustion chamber portion receptive of the mixture of exhaust gas and air, said heat exchanger portion having a heat transfer characteristic such that heat released during combustion within the combustion chamber will provide energy to heat the incoming mixture to at least a predetermined minimum temperature when a predetermined minimum rate of combustibles flows therethrough; temperature-sensing means coupled to said afterburner to detect a temperature therein; and control means connected to respond to said temperature-sensing means to reduce the flow rate of fresh air from said air addition means at a preselected maximum temperature for limiting the heat released during combustion within the combustion chamber during maximum temperature operation.

2. An afterburner system connected to receive incompletely burned exhaust gas having different flow rates and being at a variable temperature, comprising: fresh air addition means connected to mix oxygen-containing fresh air with the incompletely burned exhaust gas as a function of the rate of flow of excess combustibles in the exhaust gas; an afterburner having variable heat loss and provided with a combustion chamber wherein a heat-releasing combustion may be sustained; and temperature-responsive control means connected between said air addition means and said afterburner and operable to reduce the effectiveness of said fresh air addition means at a preselected maximum temperature within said afterburner and thereby limit the heat released during combustion within said combustion chamber during maximum temperature operation.

3. An afterburner system connected to receive incompletely burned exhaust gas from an internal combustion engine operable in a plurality of regimes having substantially different free oxygen and fuel mixture ratios, and substantially different engine throughputs, comprising: an afterburner having heat losses and operative to sustain heat-releasing combustion of said incompletely burned exhaust gas between maximum and minimum temperature limits; fresh air addition means coupled to said afterburner to provide selectively different fresh air flow rates to said afterburner during each engine operating regime; temperature control means coupled between said afterburner and said fresh air addition means responsive to the maximum temperature limit of said afterburner to reduce the fresh air flow rate for decreasing the heat released during combustion in said afterburner to a level below the heat loss at said maximum temperature limit.

4. An afterburner system connected to receive incompletely burned exhaust gas from an internal combustion engine operable in a plurality of regimes including substantially different air and fuel mixture ratios, comprising: an afterburner provided with a heat exchanger portion cooperatively coupled to a combustion chamber; fresh air addition means operable to provide oxygen-containing fresh air to the combustion chamber, the heat exchanger portion having a heat transfer characteristic such that heat released during combustion within the combustion chamber will provide energy to heat incoming incompletely burned exhaust gas and fresh air to at least a predetermined minimum temperature during each of the engine operating regimes; temperature-sensing means coupled to said afterburner to detect a maximum temperature thereof; and temperature control means connected between said temperature-sensing means and said air addition means and operable, when a preselected maximum temperature is sensed, to reduce the flow rate of air from said air addition means and thereby reduce the heat released during combustion within the combustion chamber.

5. An afterburner system connected to receive incompletely burned exhaust gas from an internal combustion engine, operable in a plurality of regimes including substantially different free oxygen and fuel mixture ratios, and including variable engine throughputs, comprising: an afterburner; fresh air addition means operable to provide selectively different flow rates of oxygen-containing fresh air to said afterburner during each of the engine operating regimes; temperature control means coupled to said afterburner to detect a preselected maximum temperature thereof and coupled to said air addition means to reduce the flow rate through said air addition means when said maximum temperature is detected so that the heat released during combustion within said afterburner is reduced.

6. In combination with an afterburner connected to receive incompletely burned exhaust gas from an internal combustion engine, operable in a plurality of regimes including substantially different free oxygen and fuel mixture ratios, and including variable engine throughputs; and fresh air addition means operable to provide selectively different rates of free oxygen-containing fresh air to the afterburner as a function of the engine operation, temperature control means comprising: a temperature-sensitive element connected to the afterburner to detect a preselected maximum temperature therein; and control means coupled to said element to reduce the flow rate through the air addition means so that the net heat released during combustion within the afterburner is reduced when said maximum temperature is detected.

7. In combination with an afterburner connected to receive incompletely burned exhaust gas from an internal combustion engine, operable in a plurality of regimes including substantially different free oxygen and fuel mixture ratios, and including variable engine throughputs; and fresh air addition means operable to provide selectively different rates of oxygen-containing fresh air to said afterburner as a function of the engine operation, and connected by a conduit to the input of the afterburner, temperature control means comprising: a temperature-sensitive element positioned within the afterburner to detect a preselected maximum temperature therein and provide a signal thereof; and transducing means operable by said signal to reduce the air flow rate through the conduit conducting air from the air addition means to the afterburner so that the net heat released during combustion within the afterburner is reduced when said maximum temperature is detected.

8. In combination with an afterburner operable at elevated temperatures, having heat losses therefrom and heat release therein and connected to receive incompletely burned exhaust gas from an internal combustion engine, operable in a plurality of regimes including substantially different air and fuel mixture ratios, and including variable engine throughputs; and fresh air addition means operable to provide selectively different flow rates of free oxygen-containing fresh air to the afterburner during each of the engine operating regimes including a conduit conductive of the fresh air provided from the air addition means to the afterburner, temperature control means comprising: a temperature-sensitive device positioned in the afterburner to detect the temperature therein and provide an electric control signal indicative of a predetermined maximum temperature; transducing means operable by said electric control signal to provide a mechanical power signal in response thereto; and valve type means operable to restrict the flow of fresh air through the conduit during said maximum temperature afterburner operation to reduce the effectiveness of the air addition means so that the heat released during combustion within the afterburner is reduced when said maximum temperature is detected.

9. In combination with an afterburner connected to receive incompletely burned exhaust gas from an internal combustion engine having means for controlling the air-fuel mixture and operable in a plurality of regimes including substantially different air-fuel mixtures and variable engine throughputs:

A. means for supplying fresh air to said afterburner at a controlled rate to maintain a substantially stoichiometric mixture during normal operation;

B. temperature sensitive means in said afterburner for reducing said air supply in response to temperatures above a predetermined maximum during certain regimes characterized by high engine throughputs and rich fuel mixtures;

C. said temperature sensitive means being associated with said mixture controlling means and said air supply for increasing the richness of said air-fuel mixture and increasing said air supply in response to temperatures below a predetermined minimum during certain other regimes characterized by low heat release.

10. An afterburner system connected to receive incompletely burned exhaust gas from a source having a variable flow rate and a variable combustible content, comprising: an afterburner operable at elevated temperatures and provided with insulation to reduce heat loss and including a heat exchanger cooperatively coupled to a combustion chamber wherein heat is released during combustion, said heat exchanger being receptive of incompletely burned exhaust gas flowing to said chamber and being receptive of burned exhaust gas flowing from said chamber to transfer heat therebetween and thus reduce heat loss of the afterburner, said heat exchanger having a heat transfer characteristic such that heat release during combustion within the combustion chamber will provide energy to heat incoming incompletely burned exhaust gas to at least a predetermined minimum temperature when a predetermined minimum rate of combustibles flow therethrough; a fresh air addition means coupled to said afterburner and normally operable to provide oxygen-containing fresh air to said afterburner at a rate providing a substantially stoichiometric mixture of oxygen and combustibles in said chamber; and temperature-limiting control means operable in accordance with a predetermined maximum temperature within said afterburner to reduce the effectiveness of said air addition means and thus reduce the net heat released during combustion within said chamber by causing the mixture to be substantially richer in combustibles than a stoichiometric mixture whereby unreacted combustibles will flow therefrom.

11. An afterburner system connected to receive incompletely burned exhaust gas from an internal combustion engine system with the exhaust gas conditionally containing hydrocarbons and simpler combustible molecules, and with the engine operable in regimes definable by variable engine throughputs and substantially different air-fuel mixture ratios being supplied to the engine, comprising: an afterburner operable at an elevated temperature and provided with a heat exchanger cooperatively coupled to a combustion chamber wherein heat is released during combustion; fresh air addition means normally operable in accordance with the exhaust gas flow rate and the air-fuel mixture ratio to provide oxygen-containing fresh air as a function of the rate of flow of excess combustibles in the incompletely burned exhaust gas, said heat exchanger having heat transfer characteristic such that net heat released during combustion within said chamber will provide energy to heat incoming incompletely burner exhaust gas and fresh air mixture to at least a predetermined minimum temperature when a predetermined minimum rate of combustibles flows therethrough; temperature-sensing means coupled to said afterburner to detect a preselected maximum temperature therein; and control means operable in accordance with said temperature-sensing means to reduce the effectiveness of said fresh air addition means during detection of said maximum temperature whereby a portion of the simpler combustible molecules will pass through said chamber without being reacted despite utilization of all free oxygen, and the heat release during combustion will be reduced.

12. An afterburner system connected to receive incompletely burned exhaust gas from an internal combustion engine provided with an intake manifold, comprising: an afterburner provided with a substantially countercurrent heat exchanger cooperatively coupled to a combustion chamber, said combustion chamber being arranged to burn at least a portion of the combustibles of the incompletely burned exhaust gas, said heat exchanger being receptive of incompletely burned exhaust gas flowing to said chamber and being receptive of relatively hotter burned exhaust gas flowing from said chamber, said heat exchanger having a heat transfer characteristic such that net heat released during combustion within said chamber will provide energy to heat incoming incompletely burned exhaust gas and fresh air to at least a predetermined minimum reaction-supporting temperature even when a predetermined minimum rate of combustibles flows therethrough, said heat exchanger being normally operable so that a point adjacent said chamber is hotter than another point remote from said chamber; a fresh air addition means operable by the engine to provide free oxygen-containing fresh air as a function of the rate of flow of the exhaust gas; first control means connected to detect the air-fuel mixture ratio supplied to the engine by using vacuum within the intake manifold and operable to throttle the flow of fresh air through said air addition means, said air addition means and said first control means being arranged to provide fresh air at a rate which will result in a substantially stoichiometric mixture in said chamber; and second control means operable in accordance with a preselected maximum temperature within said afterburner to reduce the effectiveness of said air addition means and cause the mixture to be substantially richer in combustibles than a stoichiometric mixture whereby unreacted combustibles will flow therefrom.

13. In combination with an afterburner connected to receive incompletely burned exhaust gas from an internal combustion engine having means for controlling the air-fuel mixture and operable in a plurality of regimes including substantially different air-fuel mixtures and variable engine throughputs;
   A. means for supplying fresh air to said afterburner at a controlled rate to maintain a substantially stoichiometric mixture during normal operation;
   B. temperature sensitive means in said afterburner for reducing the air supply in response to temperatures above a predetermined maximum during certain regimes characterized by high engine throughputs and rich fuel mixtures; and
   C. means connected to said mixture controlling means for increasing said air supply during certain operating regimes characterized by a rich air-fuel mixture, particularly at idling speeds during starting of said engine to assure burning and rapid heating of said afterburner.

14. In combination with an afterburner connected to receive incompletely burned exhaust gas from an internal combustion engine operable in a plurality of regimes including substantially different free oxygen and fuel mixture ratios and variable engine throughputs: fresh air addition means operable to provide selectively different rates of free oxygen-containing fresh air to the afterburner as a function of engine operation; and means responsive to afterburner heat release for restricting fresh air addition only during high engine throughputs and rich fuel mixtures.

15. In combination with an afterburner connected to receive incompletely burned exhaust gas from an internal combustion engine operable in a plurality of regimes including substantially different free oxygen and fuel mixture ratios and variable engine throughputs: fresh air addition means operable to provide selectively different rates of free oxygen-containing fresh air to the afterburner as a function of engine operation; and means connected to the afterburner for restricting fresh air addition to less than stoichiometric but greater than 60% of stoichiometric in response to high engine throughputs and rich fuel mixtures.

16. In an afterburner system connected to receive incompletely burned exhaust gas containing unburned combustibles from an internal combustion engine having means for controlling the air-fuel mixture and operable in a plurality of operating regimes, the improvement comprising:
   A. means for supplying fresh air to said afterburner at a controlled rate which will maintain a substantially stoichiometric mixture of fresh air and unburned combustibles during normal operating regimes;
   B. temperature sensitive means in said afterburner for reducing the air supply in response to temperatures above a predetermined maximum during certain operating regimes; and
   C. means for increasing said air supply in response to temperatures below a predetermined minimum during certain other operating regimes characterized by a rich air-fuel mixture.

17. In combination with an afterburner connected to receive incompletely burned exhaust gas from an internal combustion engine operable in a plurality of regimes including substantially different free oxygen and fuel mixture ratios and variable engine throughputs: fresh air addition venturi means operable to provide different rates of free oxygen-containing fresh air to the afterburner as a function of engine operation; restriction means in said venturi means for restricing fresh air addition during high engine throughputs and rich fuel mixtures; and pump means connected to said venturi means for providing positive pressure for an increase in venturi-supplied fresh air at low engine throughputs over that provided as a function of engine operation.

18. An afterburner system connected to receive incompletely burned exhaust gas from a throttle and choke controlled internal combustion engine, operable in a plurality of regimes including substantially different free oxygen and fuel mixture ratios, and including variable engine throughputs, comprising: an afterburner; fresh air addition means operable to provide selectively different flow rates of oxygen-containing fresh air to said afterburner during each of the engine operating regimes; and temperature control means coupled to said afterburner to detect preselected maximum and minimum temperature levels thereof; said temperature control means being coupled to said air addition means to reduce the flow rate through said air addition means when said maximum temperature is detected so that the heat released during combustion within said afterburner is reduced; said temperature control means being coupled to control the engine choke to increase fuel mixture ratios during said minimum temperature level.

References Cited in the file of this patent

UNITED STATES PATENTS

| | | |
|---|---|---|
| 1,789,812 | Frazer | Jan. 20, 1931 |
| 1,875,024 | Kryzanowsky | Aug. 30, 1932 |
| 1,985,713 | Bartlett | Dec. 25, 1934 |
| 2,851,852 | Cornelius | Sept. 16, 1958 |
| 2,880,079 | Cornelius | Mar. 31, 1959 |
| 2,898,202 | Houdry et al. | Aug. 4, 1959 |
| 2,937,490 | Calvert | May 24, 1960 |